United States Patent
Ross et al.

[11] Patent Number: 5,972,171
[45] Date of Patent: Oct. 26, 1999

[54] DE-ENTRAINMENT TRAY AND METHOD OF OPERATION

[75] Inventors: Mark Sheldon Ross, Havertown, Pa.; Berne K. Stober, Ringoes; John Scott Buchanan, Hamilton, both of N.J.

[73] Assignee: Mobil Oil Corporation, Fairfax, Va.

[21] Appl. No.: 08/833,675

[22] Filed: Apr. 8, 1997

[51] Int. Cl.[6] ................................................ B01D 3/32
[52] U.S. Cl. .................... 203/40; 55/237; 55/459.4; 95/219; 95/266; 95/200; 96/188; 96/196; 96/214; 202/158; 202/197; 203/88; 261/79.2; 261/114.5
[58] Field of Search ............................... 202/197, 158, 202/205; 203/40, 99, 88, 91, 100; 261/114.4, 114.1, 114.5, 79.2, 83; 55/235, 434, 459.4, 237; 95/200, 201, 202, 203, 266, 219; 96/188, 196, 214, 189; 159/2.1

[56] References Cited

U.S. PATENT DOCUMENTS

| | | | |
|---|---|---|---|
| 2,726,198 | 12/1955 | Lowman, Jr. et al. | 196/77 |
| 3,751,886 | 8/1973 | Sokolowski | 55/318 |
| 4,140,212 | 2/1979 | O'Blasny et al. | 202/205 |
| 4,629,481 | 12/1986 | Echols | 55/348 |
| 4,698,138 | 10/1987 | Silvey | 203/91 |
| 4,770,747 | 9/1988 | Muller | 202/176 |
| 5,624,642 | 4/1997 | Devanathan et al. | 422/140 |
| 5,683,493 | 11/1997 | Stober | 261/79.2 |
| 5,743,926 | 4/1998 | Bannon et al. | 55/396 |

OTHER PUBLICATIONS

Hansen, Mist Eliminator Selection, Koch Engineering Co., Inc. UPI 100. Nov. Dec. 1983, pp. 37–38.

*Primary Examiner*—Virginia Manoharan
*Attorney, Agent, or Firm*—Penny L. Prater; Malcolm D. Keen

[57] ABSTRACT

De-entrainment devices are provided for separating an entrained liquid from a vapor stream exiting a flash zone in a separation column. Methods for utilizing the de-entrainment devices are also provided. In one embodiment, the de-entrainment device of the present invention is embodied in a de-entrainment tray that has a tray deck and a plurality of risers extending vertically up from the tray deck. The risers are provided with devices for imparting rotational movement to the fluid stream, which have the vapor stream and entrained liquid, entering the riser. The rotational movement imparted to the fluid stream causes the liquid to separate from the vapor stream and to flow upward along the riser walls. The de-entrained liquid is then transported from above the separation tray back into the flash zone by way of a liquid downcomer. The vapor stream separates from the liquid within the riser and flows out of the riser upward through the column. A riser hat is used to prevent a wash liquid from entering the riser and preferably also from entering the liquid downcomer.

19 Claims, 5 Drawing Sheets

DE-ENTRAINMENT TRAY AND METHOD OF OPERATION

FIELD OF THE INVENTION

This invention relates to an improved tray design for use above a flash zone in a separation unit to more efficiently remove entrained droplets of liquid in a vapor stream that exits from the flash zone.

BACKGROUND OF THE INVENTION

Separation units, such as atmospheric distillation units, vacuum distillation units and product strippers, are major processing units in a refinery. Atmospheric or vacuum distillation units separate crude oil into fractions according to boiling point so downstream processing units, such as hydrogen treating or reforming units, will have feedstocks that meet particular specifications. Higher efficiencies and lower costs are achieved if the crude oil separation is accomplished in two steps: first, the total crude oil is fractionated at essentially atmospheric pressure, and second, a bottoms stream of high boiling hydrocarbons, which typically have an initial boiling point below about 800° F. (427° C.), is fed from the atmospheric distillation unit to a second distillation unit operating at a pressure below atmospheric, called a "vacuum" distillation process. The bottoms stream from the atmospheric distillation is also known as topped crude.

The vacuum distillation unit typically separates the bottoms stream coming from the atmospheric unit into various gas oil vapor streams categorized as light gas oil having a boiling point between about 420° and about 610° F. (216°–320° C.), heavy gas oil having a boiling point between about 610° and about 800° F. (320°–427° C.), vacuum gas oil having a boiling range between about 800° and about 1050° F. (427°–566° C.), and vacuum reduced crude having a boiling point above about 1050° F. (566° C.). The vacuum reduced crude is also known as residuum and leaves the vacuum distillation unit as a liquid bottoms stream. Additional information concerning distillation is available in Petroleum Refining Technology and Economics, Gary, J. H. and Handwerk, G. E., pp. 31–51, Marcel Dekker, Inc. (1975).

The vacuum pressure allows the distillation unit to separate the atmospheric unit bottoms into fractions at lower temperatures than if separation were at atmospheric pressure. The high temperatures necessary to vaporize the atmospheric unit bottoms at atmospheric pressure cause thermal cracking to occur, with loss in C5+ yield due to formation of gas, discoloration of the product, and equipment fouling due to coke formation.

In atmospheric or vacuum distillation, lighter hydrocarbons are vaporized and separated from relatively heavier hydrocarbons. Although the heavier hydrocarbons do not vaporize, they may be carried into the lighter hydrocarbons because of entrainment. This is particularly the case within many commercially operated vacuum distillation columns used for processing the bottoms streams from atmospheric columns. The feed stream to the vacuum distillation unit is generally under turbulent conditions and thus the resid is easily entrained in the vapors that are being flashed off from the incoming feed stream.

Entrainment is undesirable because the entrained heavier hydrocarbons are typically contaminated with metals, such as vanadium or nickel, that can poison downstream catalytic processing, such as hydrotreating, hydrocracking, or fluid catalytic cracking, to which portions of the lighter hydrocarbons are typically fed. Most downstream catalytic processes employ fluid beds or fixed beds that contain catalyst materials. For example, a gas oil product, from a vacuum or atmospheric distillation column, may subsequently feed a fluid catalytic cracking unit. If there are metals contained in the feed to a fixed bed hydroconversion process, such as soluble or organometallic compounds, the bed will generally become increasingly plugged with metals as they deposit on the catalyst. These metals deposit themselves in the interstitial space between the catalyst particles, causing the pressure drop to increase. Furthermore, the depositing metals decrease the activity of the catalyst. Therefore, it is desirable to minimize metals, especially nickel and vanadium, that may adversely affect catalyst selectivity and life.

These contaminate metals enter lighter hydrocarbons, such as gas oil, by two routes: (1) by vaporization, because the organometallic compounds have a finite vapor pressure, although their vapor pressure is extremely low and by far the greatest amount of the metallic compounds are in the very heaviest fraction of the bottoms; and (2) by liquid entrained with the gas oil vapors. The elimination of entrainment can only eliminate the metals present in the gas oil via the second route. However, because of the low volatility of the metal compounds, reduction of entrainment should significantly reduce metals content in the lighter hydrocarbons and thus improve performance of downstream catalytic units.

In vacuum distillation, a bottoms stream, separated from crude oil by an atmospheric distillation unit, is fed to a flash zone in the lower portion of the vacuum distillation unit. To reduce entrainment of residiuum from the flash zone, along with the lighter hydrocarbons, such as gas oil, a demister or wire mesh pad is frequently installed at some point between the flash zone and a gas oil draw-off. However, the demister or wire mesh pad is not completely satisfactory for a number of reasons: (1) entrainment in many cases is not found to be significantly reduced; (2) the pads have a tendency to plug with heavy oil and other material; and (3) the pads have a tendency to corrode, with holes resulting from the corrosion.

Methods other than the demister pads have been tried in the past to reduce the entrainment of residuum into the gas oil, but these methods have met with only limited success. Employing a conventional bubble-cap tray above the flash zone causes the vapor to pass through liquid on the bubble-cap tray, thereby allowing vapor to re-entrain liquid droplets. These re-entrained droplets may contain less of the higher boiling components; however, their presence in the vapor stream is deleterious to good fractionation and downstream processing. In addition, the bubble-cap tray exhibits a pressure drop, thus increasing the flash zone pressure required to drive the vapor through the bubble-cap tray. Increased pressure is not desired for the operation of the vacuum distillation column because it necessitates a higher flash zone temperature and prevents a deeper cut distillation.

The bubble-cap could be replaced by a standard chimney tray having a plurality of risers attached to a plate having holes, with a baffle attached to the top of each riser. Chimney trays are available that provide two 90° direction changes—a first 90° direction change when a stream from the riser contacts the baffle, and a second when the stream exits the chimney. These standard chimneys have a lower pressure drop than bubble-caps; however, they allow significant entrainment.

A further problem exists with most de-entrainment devices used in vacuum distillation columns used for processing the bottoms stream from an initial atmospheric distillation column. The bottoms stream is passed into the flash zone of the vacuum tower where a portion of the stream is vaporized and the remaining unvaporized portion —referred to as the residuum or "resid"—collects as a liquid at the bottom of the tower. The vapor stream travels up through the tower, passing through a de-entrainment tray, and then passing through a wash bed where the vapor is contacted with a wash liquid from the tray above. The wash liquid falls onto the de-entrainment tray where it is mixed with the de-entrained resid material. The resid material collected on the de-entrainment tray lowers the value of the wash liquid that is also collected on that tray.

A need exists in the field to design an improved de-entrainment device for separating liquid droplets entrained within a vapor stream, particularly for use in vacuum and atmospheric distillation columns between the flash zone and the separation tray zone. The improved de-entrainment device should provide superior separation of the liquid droplets from the vapor stream with a minimal pressure drop so that when used in vacuum distillation units there is not a significant decrease in the vapor volume or a need to increase the temperature in the flash zone to maintain a given vapor volume. Also, the improved de-entrainment device should function to separate the de-entrained resid material from any wash liquid being used in the tower so as to increase the value of the stream taken off of the de-entrainment tray.

SUMMARY OF THE INVENTION

The present invention provides an improved de-entrainment device to be used directly above a flash zone within a separation column to more efficiently de-entrain a liquid that is entrained within a vapor stream. The de-entrainment device is positioned on, or incorporated into, a separation tray located within the column above the flash zone.

In one embodiment, the de-entrainment device of the present invention is embodied in a de-entrainment tray that has a tray deck and a plurality of risers extending vertically up from the tray deck. The risers are defined by riser walls that preferably originate at the tray deck and define a lower opening in the tray deck at a bottom section of the risers, where the lower opening is surrounded by the riser walls.

The riser walls terminate at an upper end and define a riser wall lip. The riser wall lip defines an upper opening at the upper end of the riser. The upper opening of the riser is surrounded by a liquid downcomer that has an upper opening that is in liquid flow communication with the riser wall lip and adjacent thereto and is capable of accepting liquid flow from the riser. The liquid downcomer extends through and below the tray deck and terminates in a downcomer end, which is below the tray deck and in the flash zone. The de-entrainment device further contains means for imparting rotational flow to the fluid stream, which comprises entrained liquid and a vapor stream, that enters the lower riser opening at the bottom of the risers such that the fluid stream that enters into the riser is directed against the riser walls in an upward rotational direction sufficient to cause the entrained liquid to separate from the vapor stream and to flow upwardly along the riser walls, preferably in a rotational fashion. The de-entrained liquid that flows upwardly along the riser walls flows out of the upper riser opening over the riser wall lip and into the liquid downcomer.

The methods of the present invention include methods for de-entraining liquid from the fluid stream, which comprises a vapor in which the liquid is entrained, where the fluid stream emerges from a flash zone of a column by directing the fluid stream through an opening in a separation tray located above the flash zone. Rotational movement is imparted to the fluid stream and the fluid stream is passed upward through the riser, which is located on the separation tray, in a rotational flow pattern along the walls of the riser. The entrained liquid is separated from the vapor within the riser by the force of the rotational movement imparted to the fluid stream as the heavier liquid is thrown against the riser walls. The separated liquid flows upward along the riser walls and is then collected within a liquid downcomer that transports the liquid from a point above the opening in the separation tray back into the flash zone. The vapor, having a significant portion of the entrained liquid separated therefrom, is passed from the riser upward through the column.

The de-entrainment device of the present invention allows a refinery to more efficiently separate entrained liquid from a vapor stream as those two components rise up through a column from the flash zone. Also, the design of the de-entrainment device is such that if a wash liquid is used within the column, and comes into contact with the separation tray using or embodying the de-entrainment device, the de-entrained liquids are separated from the vapor stream and recycled back to the flash zone without coming into contact with the wash liquid. In such a way, the economic value of the wash liquid is not degraded by becoming blended with the de-entrained liquid.

DETAILED DESCRIPTION OF THE INVENTION

The present invention is directed to methods for de-entraining a liquid from a fluid stream that contains the liquid suspended in a vapor stream and de-entrainment devices for practicing such methods. The de-entrainment devices comprise a novel de-entrainment internal that is incorporated into a de-entrainment tray located above and in fluid communication with a flash zone within a separation column, such as a distillation or fractionation column, which can be either a vacuum, an atmospheric, or a high pressure column. The de-entrainment devices function to separate and remove the suspended liquid, typically present as droplets, from a fluid stream containing the liquid in a vapor stream as the fluid stream travels upwardly from a flash zone within the column or tower. The de-entrainment devices of the present invention accomplish this separation of the liquid from the vapor primarily by imparting a rotational flow to the fluid stream within a plurality of risers located on the de-entrainment tray. The rotational force imparted to the fluid stream within the risers aids in the separation and subsequent collection of the liquid from the fluid stream. The liquid is then returned through a downcomer into the flash zone and the vapor is directed upward through the distillation tower.

Figure 1:
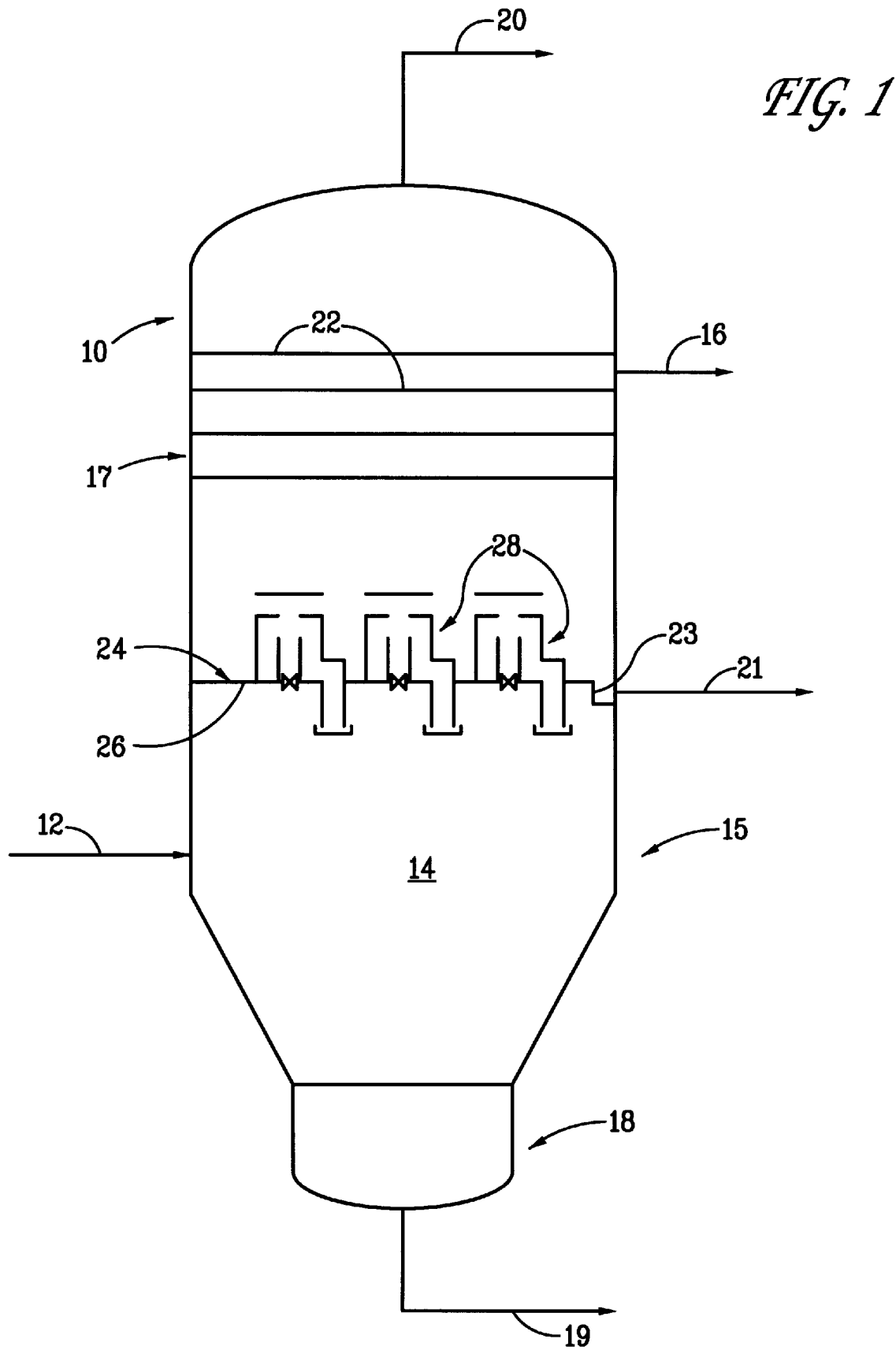
FIG. 1 is a cross-section of a tower using the inventive tray design of the present invention.

The de-entrainment device of the present invention can be more adequately described by reference to the figures. FIG. 1 is a schematic diagram of a distillation tower 10 employing the de-entrainment device of the present invention. The liquid hydrocarbon feed passes through line 12 into the flash zone 14, which is typically in the lower portion 15 of the tower 10. The feed contains various hydrocarbon compounds that have different boiling points and thus these various compounds can be separated from one another on that basis. During a typical distillation process, the temperature and pressure conditions maintained within the flash zone are such that the feed "flashes" or immediately volatilizes a substantial vapor stream that rises upward from the flash zone toward the upper section 17 of the tower 10. The portion of the feed that is not volatilized remains as a liquid and collects at the bottom 18 of the tower 10. Thus, in general within the tower 10, the feed is separated into heavier, liquid hydrocarbons that pass out of the tower 10 through a bottoms line 19 and lighter hydrocarbons that pass through the upper section 17 of the tower and that are shown in a representative fashion here as being taken off of the tower 10 through a product line 16. However, the separation process between the heavier liquid hydrocarbons and the lighter volatile hydrocarbons within the flash zone is not perfect. This is due in part to the limited size of the flash zone, the turbulent conditions within the flash zone, and the mass of the uprushing vapor stream. As such, liquid is entrained within the uprising vapor stream and is carried into the upper sections of the tower 10.

The present invention is particularly advantageous, and described throughout herein in more detail, as employed with the tower 10 that is provided with a vacuum draw-off 20 such that the tower 10 is operated as a vacuum tower. However, the invention is also applicable to an atmospheric tower and other hydrocarbon and non-hydrocarbon services wherein feed streams are flashed. Typical services include a catalytic hydrodesulfurization (CHD) product stripper, a carbonate regenerator in a Benfield $CO_2$ removal unit, or other product strippers. The tower 10 may be provided with conventional trays 22 or other conventional tower internals, such as packing (not shown).

As noted previously, the presence of the heavier, liquid hydrocarbons within the uprising vapor stream exiting the flash zone 14 is not desired. With respect to a vacuum distillation process that uses as its feed the bottoms flow from a first atmospheric column, the entrained liquid, or resid, is of lower economic value and thus its presence in the vapor stream decreases the value of that stream. Thus, the purpose of the present invention is to provide a de-entrainment device that can efficiently separate the liquid from the vapor stream. More particularly, it is preferred to recycle the entrained liquid, such as resid, to the flash zone.

The tower 10 of the present invention contains a de-entrainment tray 24 located above, and in fluid communication with, the flash zone 14 from which a fluid stream, containing a vapor stream and entrained liquid, flows upwardly through the tower 10. The de-entrainment tray 24 is provided with a tray deck 26 that carries a plurality of de-entrainment internals 28 that function to deentrain the liquid from the vapor stream contained within the uprising fluid stream. Although shown as having just three de-entrainment internals 28 on the tray 24 in FIG. 1, in practice such a tray 24 would typically contain more such devices.

Figure 2:
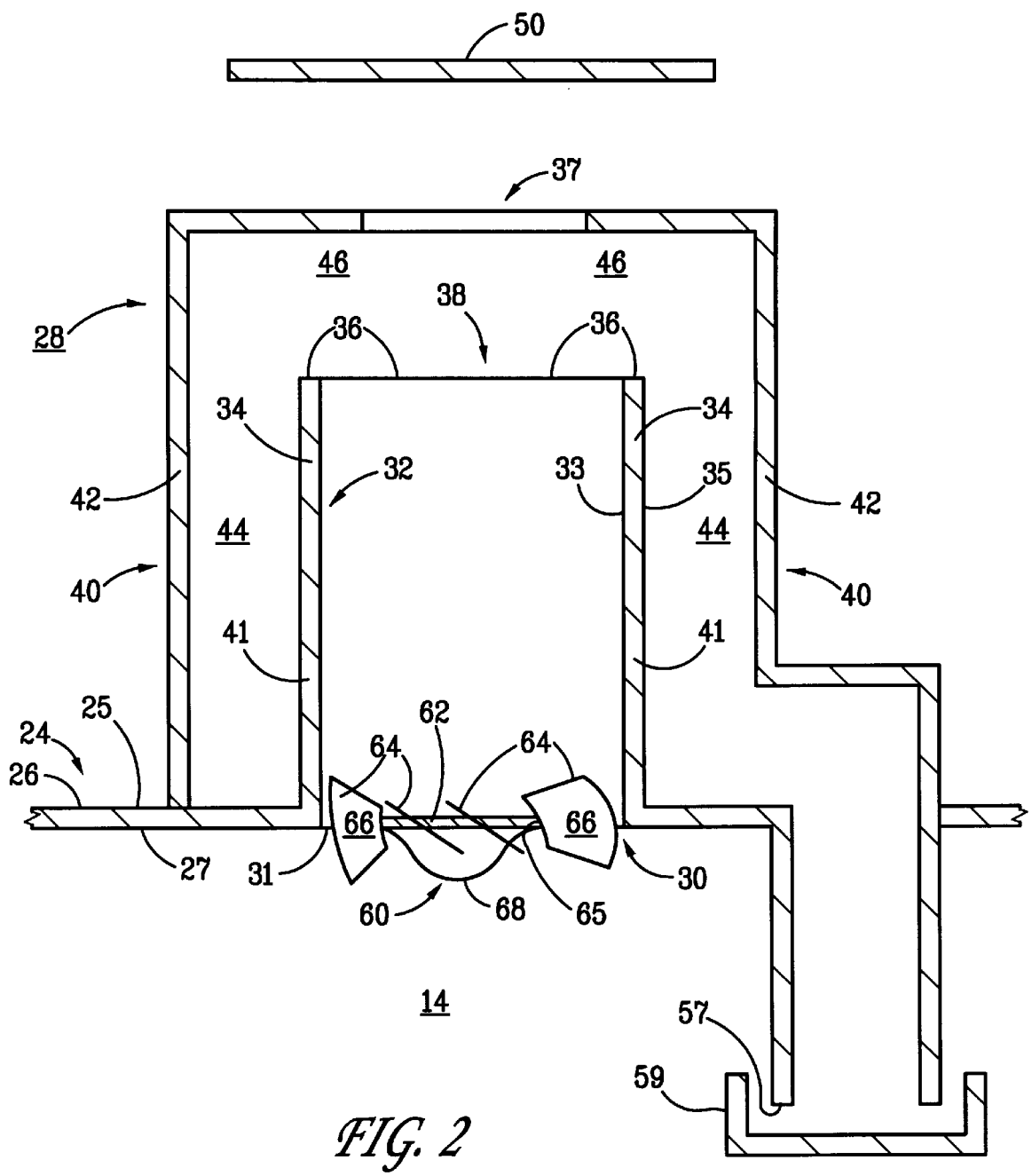
FIG. 2 is a cross-sectional side view of an embodiment of a de-entrainment device positioned on a tray in accordance with the present invention.

The de-entrainment internals 28 are shown in an expanded view in FIG. 2. An opening 30 exists through the tray deck 26 to provide an accessway for the fluid stream from the flash zone 14 to travel up through the tower 10. The de-entrainment internal 28 contains a riser 32 located above the opening 30 and is defined by riser walls 34, that preferably extend upward from the tray deck 26 and terminate in a riser wall lip 36. The riser 32 can be of any geometrical shape; however, it is preferred that the riser 32 be at least substantially, if not fully, cylindrical as defined by its walls 34. The riser wall lip 36 defines an upper riser opening 38. The riser walls 34 have an inner surface 33 and an outer surface 35.

As shown in FIG. 2, it is believed to be preferred to construct the de-entrainment device such that the bottom 31 of the riser 32 is at the same level as the lower surface 27 of the tray deck 26. However, the riser walls 34 can also be designed to extend such that the bottom 31 of the riser 32 is vertically below the lower surface 27 of the tray deck 26. Also, the riser 32 or the tray deck 26 can be constructed such that the bottom 31 of the riser 32 is vertically above the lower surface 27 of the tray deck 26.

The de-entrainment internals 28 also contain a liquid downcomer 40 defined by an outer wall 42 and an inner wall 41 that in this embodiment shown in FIG. 2 is coexistent with the riser wall 34. The liquid downcomer 40 forms a liquid conduit 44 that defines a space or volume through which liquids can flow from above the tray deck 26 (and thus above the opening 30) of the de-entrainment tray 24 back down into the flash zone 14. The liquid conduit 44 surrounds the area adjacent to the riser wall lip 36 to collect liquid that flows up and over the riser walls 34. As shown in FIG. 2, the liquid conduit 44 extends the length of the riser walls 34, although it need not extend down to the tray deck 26, but, as can be appreciated by those of ordinary skill, the conduit could be tapered off before that point so long as the conduit at some point leads to below the tray deck 26 and into the flash zone 14. A riser hat 50 will typically form a part of the de-entrainment internal 28, although it need not be physically joined thereto, to deflect liquids, such as a wash liquid, that flow from the upper section 17 of the tower 10 downward onto tray deck 26. The riser hat 50 can be affixed to the de-entrainment internal 28 or to the tray deck 26 by any conventional means (not shown).

The outer wall 42 of the liquid downcomer 40 is shown in FIG. 2 as extending over the opening 38 at the top of the riser 32 defined by the riser wall lip 36. This is one embodiment for the present invention, and the outer wall 42 can also be constructed such that it does not extend over the opening 38 and indeed could extend to a point horizontally below the riser wall lip 38, although such a design is not preferred simply because the outer riser wall 42 may be useful in collecting liquid as it exits the riser 32. In whatever design, the riser hat 50 should extend such that it covers the opening 46 of the downcomer 40 to prevent wash liquids originating from the upper section 17 of the tower 10 from entering into the downcomer 40. In such a way, the wash liquids can be effectively separated from the de-entrained liquids, thereby the economic value of the wash liquid is not diminished by the presence of the de-entrained liquids.

The de-entrainment internal 28 contains a rotational vane 60, which is preferably located near the entrance of the riser 32 at the opening 30 as shown in FIG. 2. The rotational vane 60 imparts a spin, or rotational motion, to the fluid stream rising from the flash zone 14 as that fluid stream enters the bottom of the riser 32. This rotation or spin thus forces the passing fluid stream to tangentially come into contact, in a rising, circular fashion, with the riser walls 34. As such, there is created a rotational force at the bottom of the riser 32 that propels the heavier liquid within the fluid stream against the riser walls 34. The force of the uprising fluid stream within the riser 32 causes the liquid to flow upward through the riser 32, generally in a circular fashion around the riser 32 on the inner surface 33 of the riser walls 34. The rotational vanes 60 can be attached to the de-entrainment internal 28 by securing at least a portion of the vane 60 to the inner surface 33 of the riser wall 34.

The rotational vane 60 can be designed in various ways. It is preferred to design the rotational vane 60 as a stationary device so that the full force of the uprising fluid stream is used to impart rotational movement to that stream as it flows through the riser 32. The most aerodynamic designs are preferred for use within a vacuum distillation tower to minimize the pressure drop across the de-entrainment tray 24. As shown in FIG. 2, the rotational vane 60 shown for this embodiment has a central body portion 62. Extending away from the central body portion 62 are vanes 64 that are attached to the body portion 62. The vanes 64 can be of any geometric design such that they force the uprising fluid stream coming from the flash zone 14 in a rotational fashion against the inner surface 33 of the riser 32. In the embodiment shown in FIG. 2, the vanes 64 are angled with respect to the horizontal axis of the body portion 62 (which is generally in the same horizontal plane as the tray 24). Generally, the vanes 64 can be angled from the horizontal axis from about 10° to about 80°, preferably from about 20° to about 70°, and more preferably from about 30° to about 60°. The face 66 of the vanes 64 can also be angled or contoured to have a concave or convex or some other surface contour. The number of vanes 64 per rotational vane 60 can vary, generally there are from 3 to 12, preferably from 4 to 10 vanes 64 per rotational vane 60.

The rotational vane 60 can also have a nose cone 68 protruding from the tray 24 into the flash zone 14 to provide improved aerodynamics to the rotational vane 60. The shape of the nose cone 68 can vary and is shown in FIG. 2 as a rounded top surface and in FIG. 4 as a more pointed top surface.

Figure 3:
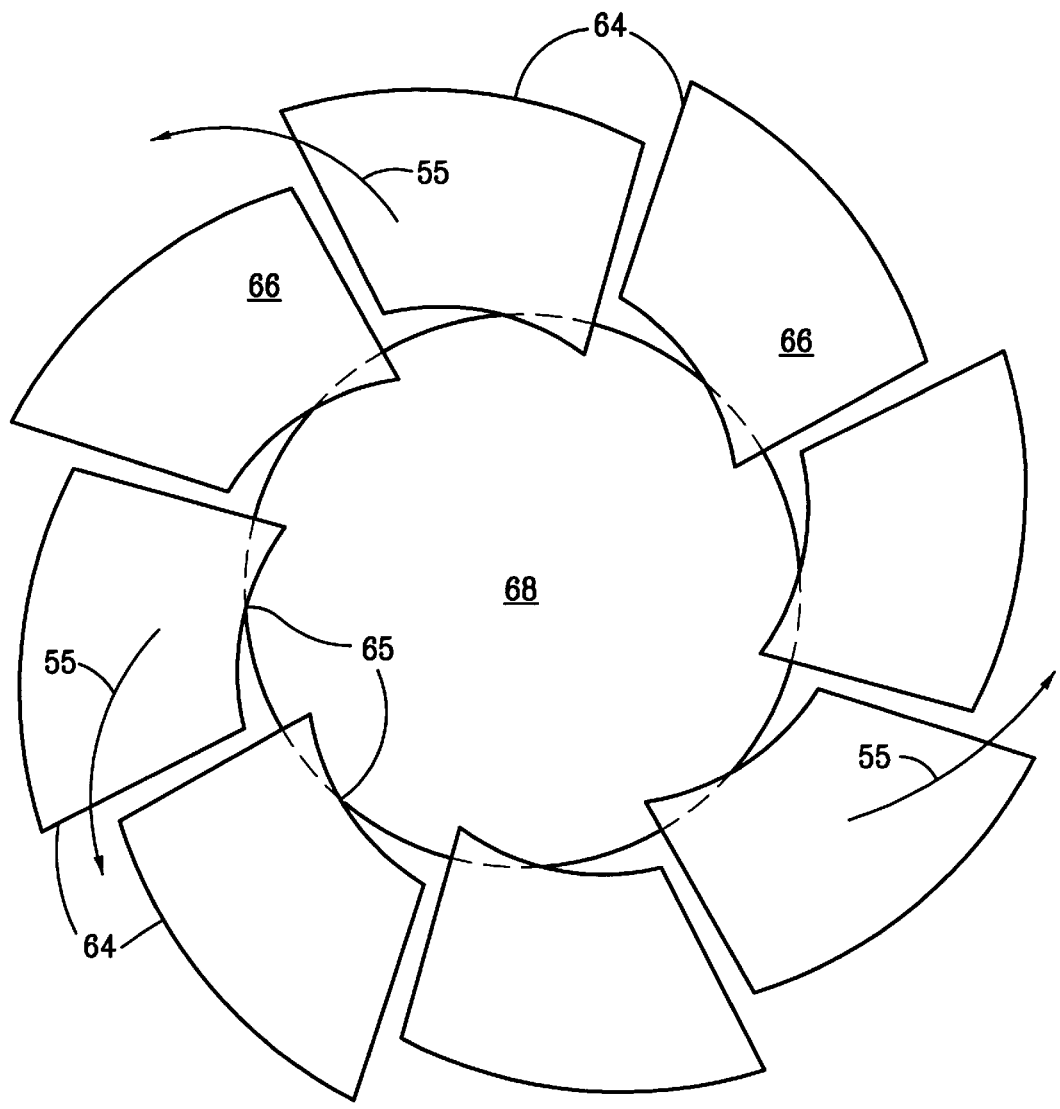
FIG. 3 is a bottom view of an embodiment of the rotational vane of the present invention.

A view from the flash zone 14 looking upward at the embodiment of the rotational vane 60 shown in FIG. 2 is shown in FIG. 3. Here the central body portion is hidden from view by the nose cone 68. The vanes 64 are attached to the vane 60 at points 65. In the general construction of the rotational vanes 60, all of the portions of the rotational vanes 60 can be constructed from metal or metal alloys such as steel, and they also can be constructed of any other suitable materials for use in such columns. The attachment of the vanes 64 can be by way of a weld or by fabricating the entire rotational vane 60 as one piece, much like a propeller for a motorized water boat. As shown in FIG. 3, the vanes 64 are angled such that a portion of the vanes 64, if located at the bottom of the riser as shown in FIG. 2, would extend into the flash zone 14 and a portion extends back into the riser 32. The faces 66 of the vanes 64 are shown as being flat, but can be curved. Lines 55 show the changed path of a fluid that would strike the rotational vane 60.

Figure 4:
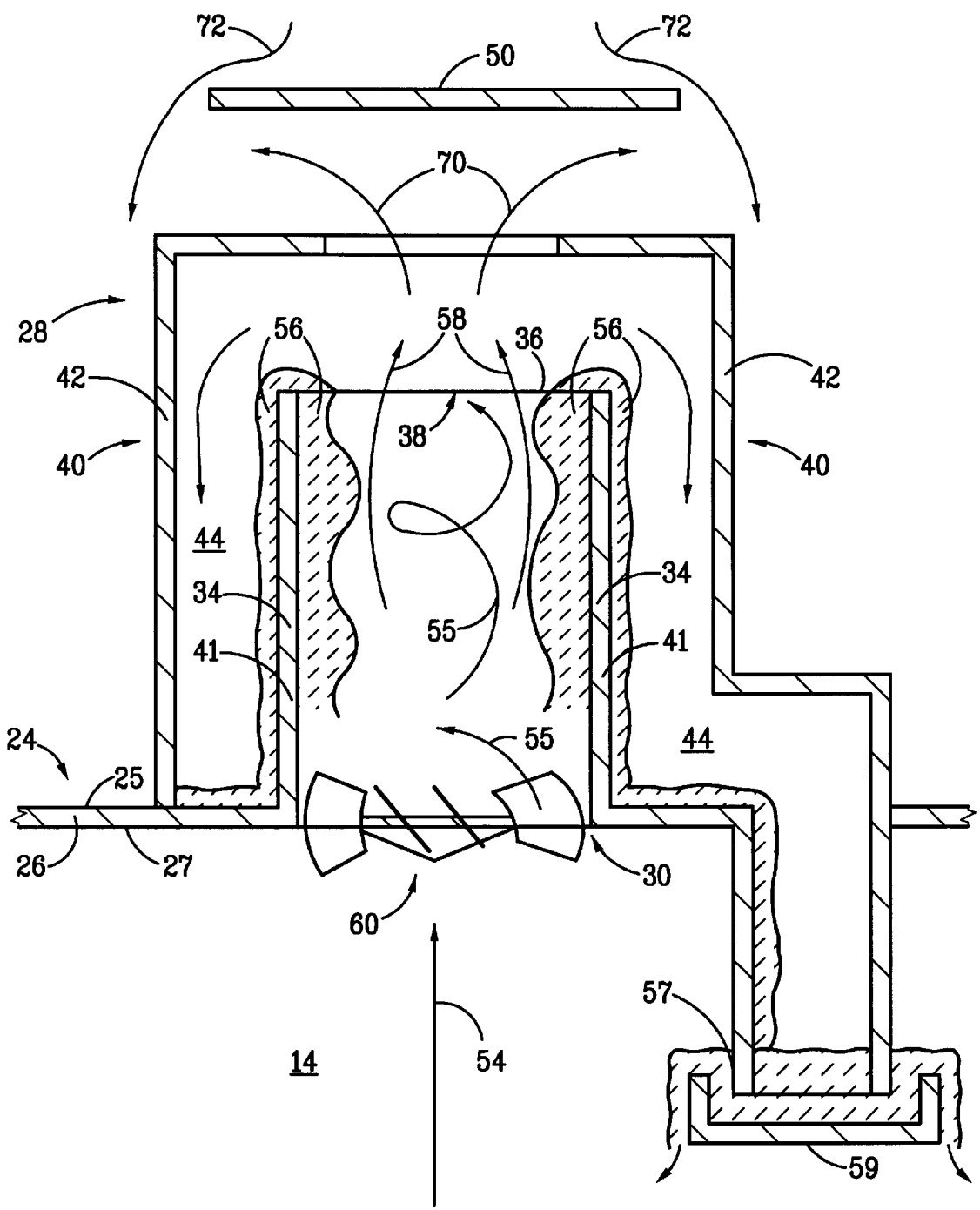
FIG. 4 is a cross-sectional side view of an embodiment of a de-entrainment device positioned on a tray in accordance with the present invention showing process flow paths.

As an example of the use of the present invention, reference is made to FIGS. 1, 2, and 4, wherein the process of operating a tower 10 that is a vacuum distillation tower handling as a feed the bottoms fraction from an atmospheric crude oil distillation tower. The tower 10 operates at vacuum pressure typically in the range of between 0.05 and 1 atm. The hydrocarbon feed passes through line 12 into the flash zone 14. The hydrocarbon feed typically has a boiling point higher than about 610° F. (320° C.). This feed stream flashes in zone 14 to form a fluid stream 54, typically comprising gas oil vapor and entrained droplets of vacuum reduced crude. Typically, gas oil vapors include light gas oil having a boiling point between about 420° and about 610° F. (216–320° C.), heavy gas oil having a boiling point between about 610° and about 800° F. (320–427° C.) and vacuum gas oil having a boiling range between about 800° and about 1050° F. (427–566° C.). The vacuum reduced crude has a boiling point of at least about 1050° F. (566° C.). The vacuum reduced crude is also known as residuum (or resid) and is designed to exit the vacuum distillation tower as the liquid bottoms stream 19.

The fluid stream 54 passes upwardly through the lower portion 15 of the tower 10. Although not shown, a demister or wire mesh pad may be situated within the flash zone 14 and below the de-entrainment tray 24. The fluid stream 54 rises to come into contact with the lower surface 27 of the tray deck 26. The pressure head forces fluid stream 54 to flow through the openings 30 found within tray deck 26 and up into the riser 32.

At the opening 30 of the riser 32 the fluid stream 54 passes over the rotational vane 60. The force of the uprising fluid stream 54 as it passes over the rotational vane 60 imparts a spin, or rotational movement, to the fluid stream 54. This rotational movement is generally depicted by lines 55 within the riser 32. The effect here is that the fluid stream 54 begins to flow up through the riser 32 in a spiral fashion with the heavier liquid 56 being thrown against the riser walls 34. The velocity of the fluid stream 54 provides the driving force to propel the de-entrained liquid 56 upward in a circular, spiral fashion along the riser walls 34. The lighter vapor stream 58 separates from the heavier liquid 56 within the riser 32 and flows upward and out from the top of the riser 32 through opening 38. Thus, the fluid stream 54 is separated into its two constituent components, the liquid 56 and the vapor stream 58 within the riser 32.

The de-entrained liquid 56 flows upward along the riser walls 34 and eventually flows out over the riser wall lip 36. This liquid, which in the example of the vacuum distillation tower would be primarily de-entrained resid material, is collected within the liquid downcomer 40. As shown in FIG. 4, the liquid 56 flows down through the liquid conduit 44 and is transported thereby back into the flash zone 14. As shown in FIG. 4, the downcomer 40 is provided with a seal pan 59 that serves to prevent the fluid stream 54 from passing through the de-entrainment tray 24 without passing through the risers 32. The de-entrained liquid 56 pools within the seal pan 59 thereby forming a liquid seal to the end 57 of the downcomer 40. The de-entrained liquid 56 flows over the edge of the seal pan 59 and back into the flash zone 14.

As shown in FIG. 4, the vapor stream 58 that exits through the opening 36 at the top of the riser 32 flows past the outer wall 42 of the downcomer 40—shown as vapor steam lines 70—and out of the de-entrainment internal 28, past the riser hat 50, and upward through the tower 10.

In common practice of the operation of a vacuum distillation tower handling a hydrocarbon stream as above described, a wash bed that consists of packing or stacked grids is located above the de-entrainment tray. Liquid that is collected from the tower zone above the wash bed is fed and distributed to the top of the wash bed and drains down through the wash bed. The vapor stream that rises from the de-entrainment tray is brought in contact with the wash liquid within the wash bed. Within the wash bed, the less volatile constituents of the vapor stream are condensed and entrained liquid droplets are also collected. These liquids are then directed downward from the wash bed to the de-entrainment tray. The wash liquid that falls from the wash bed is precluded from falling through the de-entrainment internal 28 and into the flash zone 14 by means of the riser hat 50. As shown in FIG. 4, the wash liquid 72 flows over the riser hat 50 and down along the outside of the downcomer 40. The wash liquid 72 collects on the upper surface 25 of tray deck 26. This wash liquid 72 can be collected and removed from the tray deck 26 via line 21 as shown in FIG. 1 by conventional means such as providing a tray downcomer 23 at the edge of tray 24. The riser hat 50 is designed and positioned such that it directs the downward flow of the wash liquid 72 away from the top opening 36 of the riser 32 and away from the entrance of the downcomer 40 and therefore the wash liquid 72 is not degraded by being blended with the de-entrained liquid.

Figure 5:
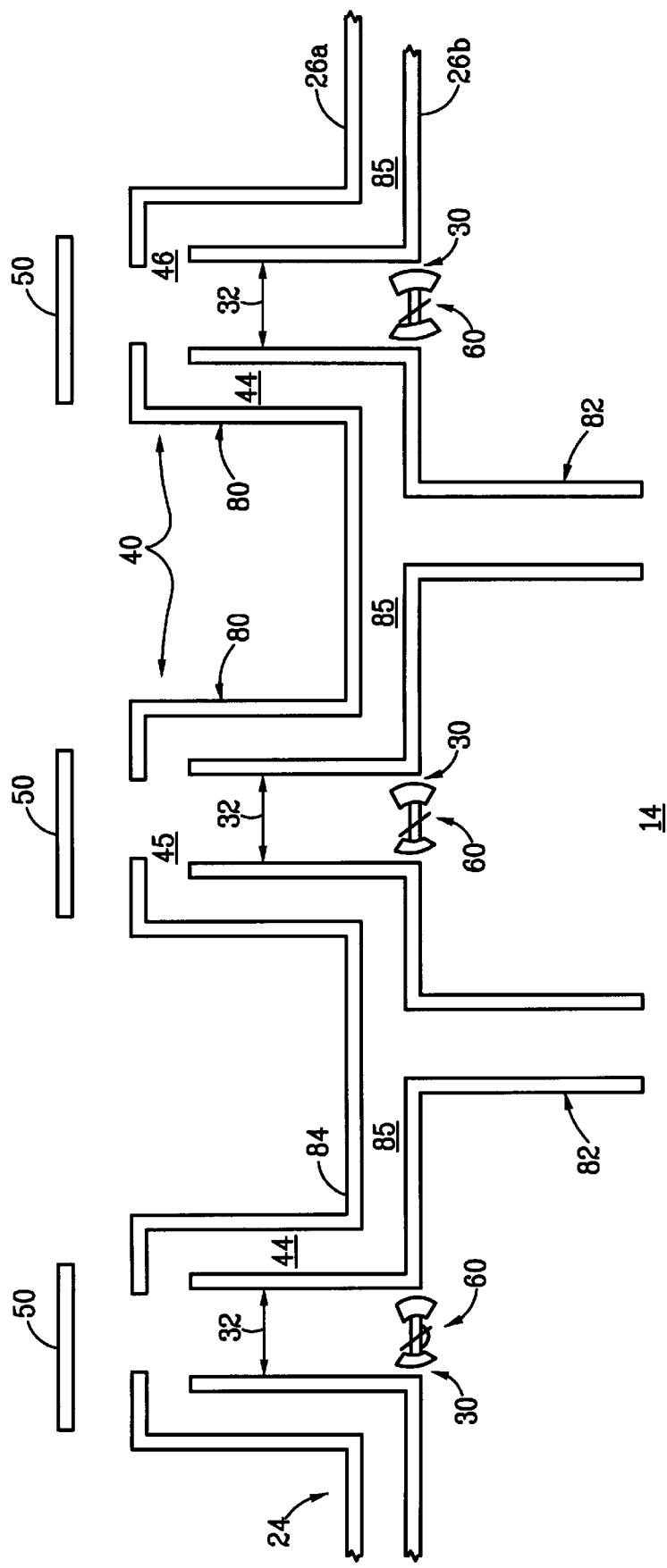
FIG. 5 is a cross-sectional side view of a further embodiment of a de-entrainment device positioned on a tray in accordance with the present invention.

The configuration of the de-entrainment internals 28 on the de-entrainment tray 24 can be varied to interconnect the liquid conduits defined by the liquid downcomers in a fashion such that they are shared by more than one riser 32. One embodiment of this design alternative is shown in FIG. 5, wherein the plate forming the de-entrainment tray has an upper surface 26a and a lower surface 26b and there is a liquid passageway 85 therebetween. The liquid passageway 85 connects the liquid conduits 44 from adjacent liquid downcomers 40 such that a plurality of the liquid conduits 44 empty into a bottom portion 82 of a downcomer 40. The downcomer 40 is thus separated into an upper portion 80 that is located above the upper surface 26a of the tray 24 and the bottom portion 82 that is located below the lower surface 26b of the tray 24. Such a design may in some cases aid in the removal of the de-entrained liquid coming out of the risers 32. FIG. 5 is shown in only two dimensions, but layout of the risers 32 and bottom portion 82 of the liquid downcomers 40 can be such that they are not in a straight row across the surface of the tray 24 and thus several liquid conduits 44 can empty into a single bottom portion 82 of a downcomer 40.

The de-entrainment internals 28 can be arranged in any fashion on the tray 24. The size of the internals 28 can vary with respect to the size of the column in which they are to be used, and the flow rates within the column. In general, the de-entrainment internals 28 will be from about 10 to about 36 inches (25–91 cm) in height and from about 8 to about 24 inches (20–61 cm) in their widest internal dimension. The downcomers 40 will typically extend at least about 6 inches (15 cm) below the lower surface 27 of the tray 24 into the flash zone 14. The materials used to construct the various portions of the de-entrainment internals 28 are generally similar to those described for the rotational vanes 60, such as metal or metal alloys such as steel, or any other suitable material that can withstand the particular conditions under which the tower is to operate.

What is claimed is:

1. A de-entrainment device for use at a point adjacent to a flash zone in a separation column, for separating an entrained liquid from a vapor stream, comprising:
   (a) a de-entrainment tray having a tray deck that has an upper and a lower surface;
   (b) a plurality of risers, at least a portion of which extend vertically up from the upper surface of the tray deck, each of the risers being defined by riser walls that terminate in a riser wall lip and having a lower riser opening and an upper riser opening, the upper riser opening being defined by the riser wall lip and located vertically above the upper surface of the tray deck;
   (c) a plurality of liquid downcomers, each downcomer having an upper portion and a lower portion wherein the upper portion is located above the tray deck and has an upper opening in liquid flow communication with the upper riser opening, and wherein the lower portion extends through and below the lower surface of the tray deck and terminates in a downcomer end located in a flash zone; and
   (d) means for imparting rotational flow to a fluid stream comprising entrained liquid and a vapor stream that enters the lower opening of the risers such that the fluid stream is directed against the riser walls in an upward rotational direction sufficient to cause the entrained liquid to separate from the vapor stream, wherein both the vapor stream and the separated liquid flow through the upper riser opening and the separated liquid flows out over the riser wall lip and into the liquid downcomer.

2. The de-entrainment device of claim 1 wherein the rotational flow means is located at a point proximate to the lower opening of the riser.

3. The de-entrainment device of claim 1 wherein the lower opening of the riser is located at a point vertically below the lower surface of the tray deck.

4. The de-entrainment device of claim 1 wherein the plurality of the liquid downcomers are constructed such that the upper portion of the liquid downcomer above the tray deck comprises an inner and an outer downcomer wall and wherein the inner downcomer wall is defined by the riser walls.

5. The de-entrainment device of claim 1 further comprising a plurality of riser hats located vertically above the upper riser opening for preventing the flow of a wash liquid originating above the upper riser opening down into the upper riser opening.

6. The de-entrainment device of claim 5 wherein the upper opening of the liquid downcomers are located vertically beneath the riser hats.

7. The de-entrainment device of claim 1 wherein the riser walls are at least substantially cylindrical.

8. A de-entrainment device for use at a point adjacent to a flash zone in a separation column for separating an entrained liquid from a vapor stream, comprising:
   (a) a de-entrainment tray having a tray deck having an upper and a lower surface separated by a liquid conduit;
   (b) a plurality of risers, at least a portion of which extend vertically up from the upper surface of the tray deck, the risers being defined by riser walls and having a lower riser opening and an upper riser opening that is located vertically above the upper surface of the tray deck;
   (c) a plurality of upper liquid downcomers located above the upper surface of the tray deck having an upper opening in liquid flow communication with the upper riser opening, the upper liquid downcomer extending downward around the riser walls to the liquid conduit and being in liquid flow communication with the liquid conduit;
   (d) a plurality of lower liquid downcomers extending from the liquid conduit to below the lower surface of the tray deck and terminating in a lower liquid downcomer end located within a flash zone, the lower liquid downcomer being in liquid flow communication with the liquid conduit; and
   (e) means for imparting rotational flow to a fluid stream comprising liquid entrained within a vapor stream that enters the lower opening of the riser such that the fluid stream is directed against the riser walls in an upward rotational direction sufficient to cause the entrained liquid within the fluid stream to separate from the vapor stream and to flow through the upper riser opening and into the liquid downcomer.

9. The de-entrainment device of claim 8 wherein the rotational flow means is located at a point proximate to the lower opening of the riser.

10. The de-entrainment device of claim 8 wherein the lower opening of the riser is located at a point vertically below the lower surface of the tray deck.

11. The de-entrainment device of claim 8 wherein a plurality of the liquid downcomers are constructed such that the upper liquid downcomer above the tray deck comprises an inner and an outer downcomer wall and wherein the inner downcomer wall is defined by the riser walls.

12. The de-entrainment device of claim 8 wherein the riser walls are at least substantially cylindrical.

13. The de-entrainment device of claim 8 wherein the ratio of risers to lower liquid downcomers is greater than 1:1.

14. The de-entrainment device of claim 8 further comprising a plurality of riser hats located vertically above the upper riser opening for preventing the flow of a wash liquid originating above the upper riser opening down into the upper riser opening.

15. The de-entrainment device of claim 14 wherein the upper opening of the liquid downcomers are located vertically beneath the riser hats.

16. A method of deentraining liquid from a fluid stream comprising a vapor in which the liquid is entrained where the fluid stream emerges from a flash zone in a column, comprising the steps of:

(a) directing the fluid stream through an opening in a separation tray located above a flash zone;

(b) imparting rotational movement to the fluid stream and subsequently passing the fluid stream upward through at least a portion of a riser, which is connected to the separation tray and is defined by riser walls that terminate in a riser wall lip, in a rotational flow pattern along the walls of the riser;

(c) separating the entrained liquid from the vapor within the riser, and directing both the separated liquid and vapor through an upper opening of the riser that is defined by the riser wall lip;

(d) collecting the separated liquid within a liquid downcomer that transports the liquid from the upper riser opening to the flash zone, wherein the liquid downcomer has an upper portion and a lower portion wherein the upper portion is located above a tray deck and has an upper opening that is in flow communication with the upper riser opening and wherein the lower portion extends through and below a lower surface of the tray deck and terminates in a downcomer end; and (e) flowing the vapor from the riser upward through the column.

17. The method of claim 16 wherein the rotational movement is imparted to the fluid stream as the fluid stream enters into the riser.

18. The method of claim 16 wherein the entrained liquid that is separated within the riser flows upward along the walls of the riser in a rotational fashion.

19. The method of claim 16 wherein the rotational movement is imparted by a rotational vane located at a point proximate to a lower opening in the riser.

* * * * *